US008856238B2

(12) United States Patent
Los et al.

(10) Patent No.: US 8,856,238 B2
(45) Date of Patent: Oct. 7, 2014

(54) REPRESENTING REMOTELY AVAILABLE USERS THROUGH WORKING ELSEWHERE STATUS (75) Inventors: David Los, Bothell, WA (US); Jaya Matthew, Seattle, WA (US); Nelson Siu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 13/369,570

(22) Filed: Feb. 9, 2012

(65) Prior Publication Data

US 2013/0212252 A1     Aug. 15, 2013

(51) Int. Cl.
*G06F 15/16*          (2006.01)

(52) U.S. Cl.
USPC .......... 709/205; 709/202; 709/203; 709/204; 709/224; 709/228; 709/244; 709/248; 709/249

(58) Field of Classification Search
USPC ........................................................ 709/203
See application file for complete search history.

(56) References Cited

U.S. PATENT DOCUMENTS

| | | | |
|---|---|---|---|
| 6,526,581 B1 * | 2/2003 | Edson | 725/74 |
| 7,035,390 B2 * | 4/2006 | Elliott | 379/201.02 |
| 7,272,662 B2 * | 9/2007 | Chesnais et al. | 709/246 |
| 7,284,046 B1 * | 10/2007 | Kreiner et al. | 709/223 |
| 7,305,552 B2 | 12/2007 | Ruetschi et al. | |
| 7,545,783 B2 * | 6/2009 | Caspi et al. | 370/338 |
| 7,620,404 B2 * | 11/2009 | Chesnais et al. | 455/456.1 |
| 7,668,157 B2 * | 2/2010 | Weintraub et al. | 370/352 |
| 7,801,954 B2 | 9/2010 | Cadiz et al. | |
| 8,054,961 B2 | 11/2011 | Skubnik et al. | |
| 8,078,688 B2 * | 12/2011 | Ansari et al. | 709/217 |
| 8,204,521 B2 * | 6/2012 | Hardy et al. | 455/466 |
| 8,219,126 B2 * | 7/2012 | Marlow et al. | 455/466 |
| 8,433,805 B2 * | 4/2013 | Lowry | 709/227 |
| 2004/0133638 A1 | 7/2004 | Doss et al. | |
| 2004/0174975 A1 * | 9/2004 | Sylvain et al. | 379/211.01 |
| 2004/0255043 A1 * | 12/2004 | Salo et al. | 709/236 |
| 2004/0267887 A1 * | 12/2004 | Berger et al. | 709/206 |
| 2006/0075091 A1 | 4/2006 | Beyda et al. | |
| 2007/0027732 A1 | 2/2007 | Hudgens | |
| 2008/0256192 A1 | 10/2008 | Pinard et al. | |
| 2009/0147772 A1 | 6/2009 | Rao et al. | |
| 2010/0064014 A1 | 3/2010 | Mclaughlin | |
| 2011/0307856 A1 | 12/2011 | Klaka et al. | |
| 2012/0005230 A1 | 1/2012 | Jhanji | |

OTHER PUBLICATIONS

"International Search Report", Mailed Date: May 27, 2013, Application No. PCT/US2013/025003, Filed Date: Feb. 7, 2013, pp. 9.
Horvitz, et al., "Coordinate: Probabilistic Forecasting of Presence and Availability", Retrieved at <<http://uai.sis.pitt.edu/papers/02/p224-horvitz.pdf>>, Proceedings of the Eighteenth Conference on Uncertainty and Artificial Intelligence, Aug. 2002, pp. 224-233.

* cited by examiner

*Primary Examiner* — Michael Y Won
(74) *Attorney, Agent, or Firm* — Louise Bowman; Jim Ross; Micky Minhas (57) ABSTRACT

An application provides a "working elsewhere" status for users working at a location other than their regular work location and still available for meetings, communication sessions, etc. The application determines a user location being other than regular work location and the user still being available through user selection, information from user associated application(s), and/or from a presence notification. The application adjusts the user status to a working elsewhere status and makes the new status available to other applications such as calendaring, communication applications, presence service(s), and comparable ones. Meetings may be scheduled, communication sessions facilitated if the working elsewhere status is sufficient/acceptable for other users.

19 Claims, 6 Drawing Sheets

REPRESENTING REMOTELY AVAILABLE USERS THROUGH WORKING ELSEWHERE STATUS

BACKGROUND

The proliferation of digital communication has enabled economic and social changes not imagined in previous cultures. Digital signals carried by wire or transmitted wirelessly enable multiple parties to engage in a variety of remote venues including business and personal activities. Instant communication has enabled business entities to decentralize in order to provide work environments better suited to demand. Decentralization of work environments has also benefited employee and clients alike by enabling employees to support client from client locations. Additionally, digital communications has enabled sharing of a variety of media. Enhanced media exchange has fulfilled variety of needs such as audio, video, data transmissions to better meet client demands.

Conventional communication solutions represent presence information of a user through a variety of status indicators. Most indicators describe the users' availability or unavailability. Some indicators also include additional status information about the users' status such as duration of a status and location information. While most modern communication applications are suited to manage user's status information for a local site, modern solutions lack ability to scale to remote solutions. Remote connectivity is expanding exponentially. Remote connectivity solutions provide multimodal connectivity applications rivaling local counterparts. As a result, there is an increasing demand for modern communication solutions to provide a solution for managing availability information of remote users.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to using a "working elsewhere" status for users working at a location other than their regular work location and still being available for meetings, communication sessions, etc. An application may determine a user location being other than regular work location and the user still being available through user selection, information from user associated application(s), and/or from a presence notification. The application may adjust the user status to a working elsewhere status and make the new status available to other applications such as calendaring, communication applications, presence service(s), and comparable ones. Meetings may be scheduled, communication sessions facilitated if the working elsewhere status is sufficient/acceptable for other users.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a user's presence status may be represented as working elsewhere indicating that the user is not at their regular work location, but still available for meetings, communication sessions, and so on. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Working elsewhere status may be an additional status to existing user statuses such as free, busy, tentative, out of office, and similar ones. The working elsewhere or comparable status may indicate user's availability at a location other than the user's regular work location, for example, a remote work site, a conference location, a travel location, and so on. The user with a working elsewhere status may be able to accommodate communications with other users through applications providing various communication modalities. The working elsewhere status may indicate an inability to meet in person, but the user may be available for online meetings. In some embodiments, the working elsewhere status may provide the location of the user to authorized users. This may enable others to offer alternative meeting locations within a predetermined proximity to the remote user's location.

Throughout this specification, the term "platform" may be a combination of software and hardware components for providing and/or using a "working elsewhere" status for facilitating communications, online meetings, and similar operations. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
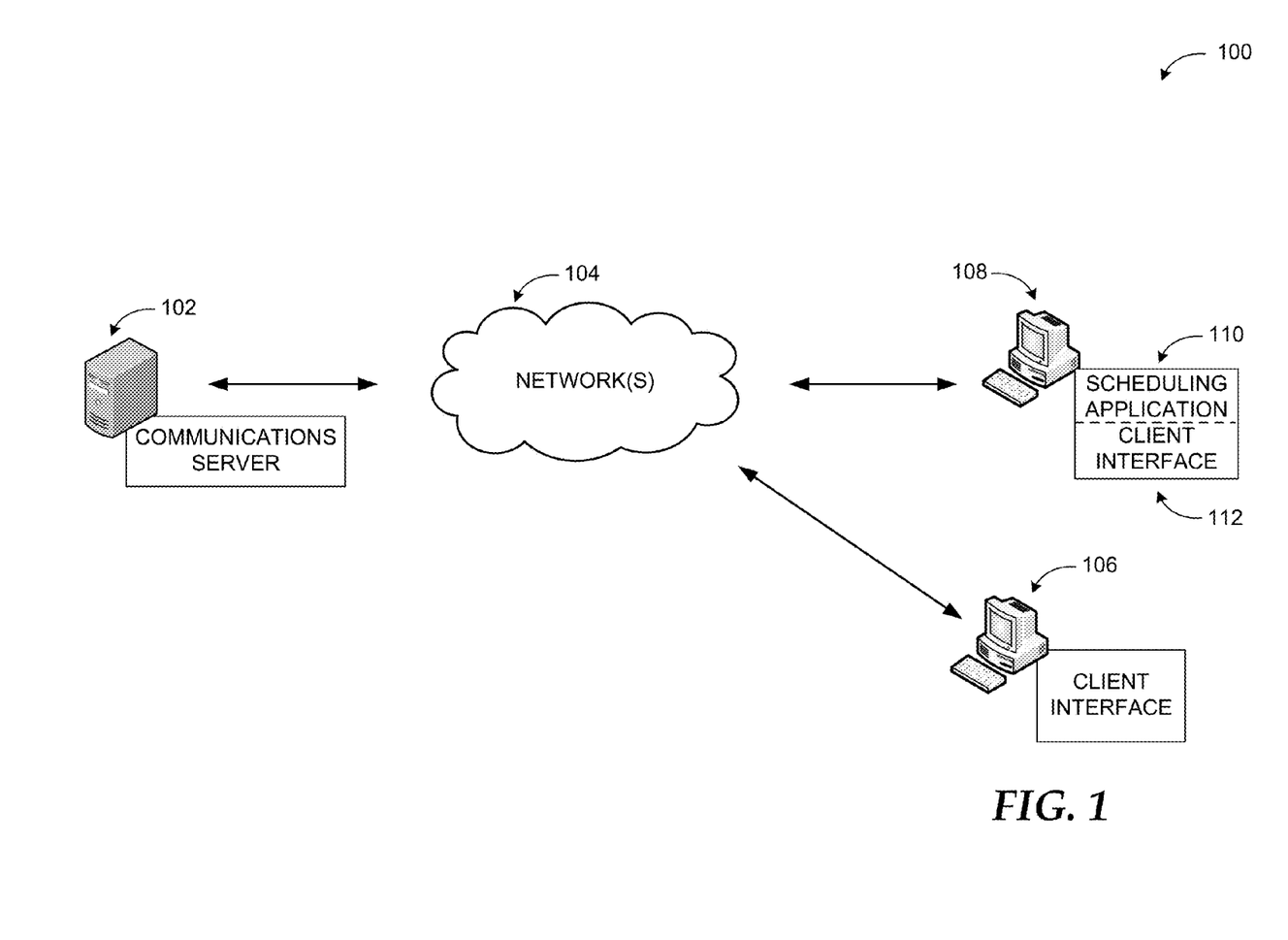
FIG. 1 illustrates a networked environment, where a communication application may represent users with a working elsewhere status according to some embodiments.

Referring to FIG. 1, diagram 100 illustrates a networked environment, where a communication application may represent users with a working elsewhere status according to some embodiments. The computing devices and computing environments shown in diagram 100 are for illustration purposes. Embodiments may be implemented in various local, networked, cloud-based and similar computing environments employing a variety of computing devices and systems, hardware and software.

In an example environment illustrated in diagram 100, a user status may be determined by a local application (e.g. a scheduling application 110) executed on client device 108 or a remote service such as one executed on communications server 102 and published to other users through one or more networks 104. A client interface 112 of the scheduling application 110 may display the user's current status and enable the user to modify the current status or attributes associated with the current status. For example, the user may select particular users to be able to access the actual location information, type and nature of user's busy times, etc. In a system according to embodiments, the user may select a "working elsewhere" status indicating that the user is not at their regular work location, but may be available for certain meetings, communication sessions, and so on.

In other embodiments, the user's working elsewhere status may be inferred by the scheduling application 110 or the remote service based on information from one or more sources such as the user's geographic information, work calendar information, personal calendar information, available/activated communication modalities in the user's device, and similar ones. Furthermore, quantity and type of additional information such as actual location, available communication modalities, other scheduling information, and the like may be published along with the user's working elsewhere status to other users based on user preferences, default and/or customizable rules, permission levels of the other users, etc.

Another user employing client device 106 may receive the published status information of the user and schedule an online meeting, move or cancel and in-person meeting, select a suitable modality for a planned communication session with the user, or perform comparable actions based on the received status information. For example, if the user's working elsewhere status indicates that the user is working from home, a colleague planning to organize a video conference may opt for an audio conference with the user. Similarly, a colleague at a remote work location may determine from the user's working elsewhere status that the user is near his/her location and schedule an in-person meeting (or vice versa).

Figure 2:
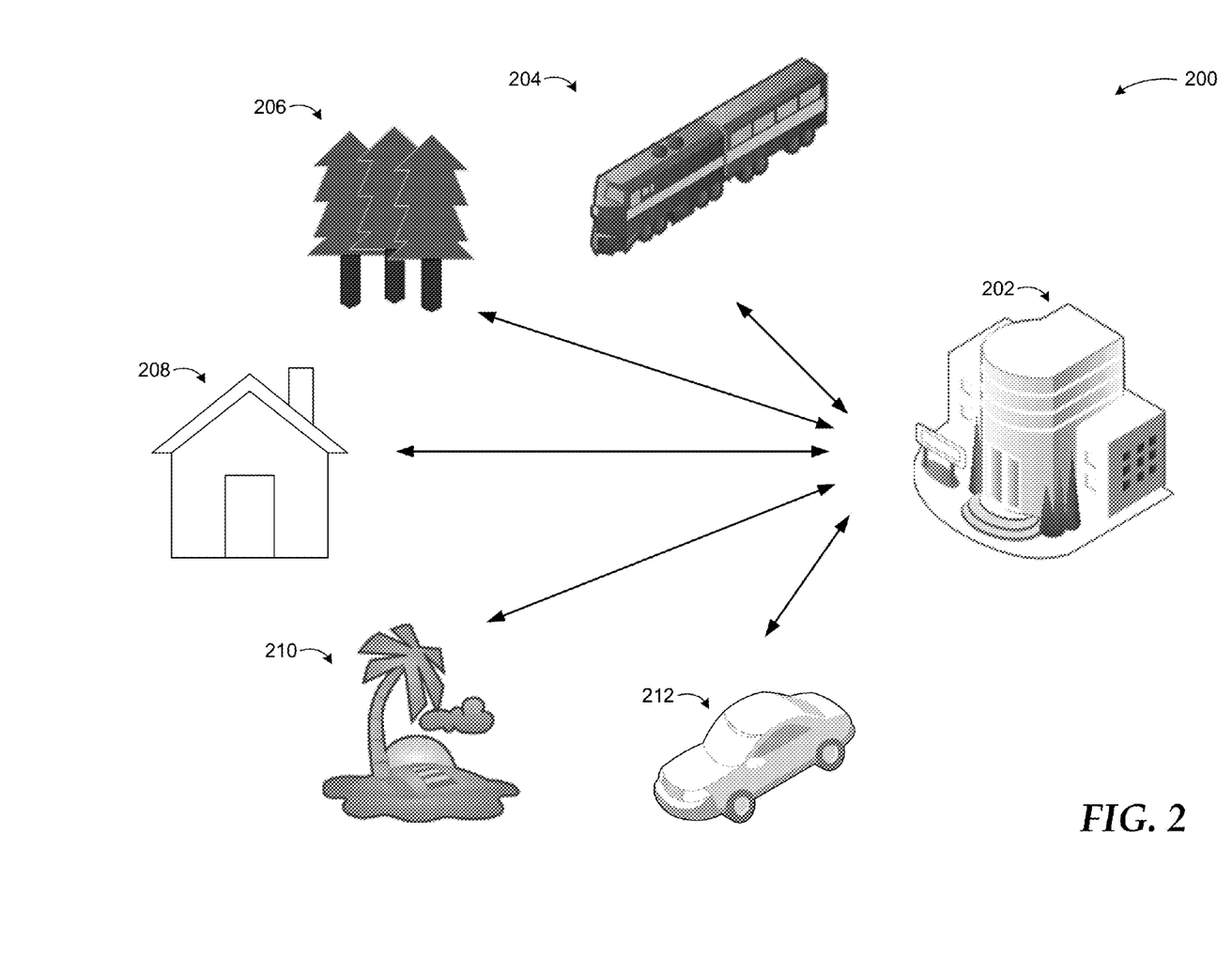
FIG. 2 illustrates example scenarios where a working elsewhere status may be used according to embodiments.

FIG. 2 illustrates example scenarios where a working elsewhere status may be used according to embodiments. Diagram 200 displays multiple scenarios in which a user may use a working elsewhere status to indicate their availability while at a location other than their regular work location.

The user's status may be stored and published by an application executed at one or more servers on site 202. Site 202 may be the "local site" for the user such as a place of business. Alternatively, the application may be part of hosted service executed over a cluster of servers providing communication services at site 202 and other locations.

In an example scenario, a user may be using a major form of transportation such as train 204. In such a scenario, the user may have access to a communication and/or collaboration service through a variety of mobile devices with different capabilities. Thus, the user may be available for a text message exchange, data exchange, or even an audio/video communication session while travelling in train 204. Similarly, the user may also be working elsewhere in an outdoor setting 206. In an example scenario, the user may be available to accept phone calls.

In another example scenario a user may be available remotely while working at a home office 208. From the home office 208, the user may be enabled to accept multi-modal communications including but not exclusive to video, audio, document sharing, text messaging, etc. The user may also be similarly available for multi-modal communications from a vacation site 210. Through a notebook computer, for example, the user may be remotely available for online meetings and similar events. Additionally, the user may be remotely available from a vehicle 212. In a vehicle 212, limited connectivity may be available. Thus, the user may be available for only audio communications, which may be indicated as part of the details within the user's working elsewhere status.

According to some embodiments, the user may directly indicate their status through a user interface option on a communication application, a scheduling application, or similar one. The status may also be inferred through an analysis. For example, a location of the user may be detected as other than the regular work location during working hours and the user may be actively using email or similar work related application(s). Thus, the user's status may be set to working elsewhere subject to change by the user. Other information sources such personal calendars, social networking site schedules, work-related application usage, and comparable ones may also be employed in determining the user's status as working elsewhere. This status may then be published as presence status such that any application may consume it. The working elsewhere status may not only be used for organizing meetings or communication sessions, but applications or hosted services providing a wide range of services to users (e.g., location-based services) may also take into account that the user may be at a remote location but still working.

The actual location information may be obtained utilizing global positioning system (GPS), a wireless network triangulation, or a wired network tracking of the location of the user. According to other embodiments, the status of the user may also include (in addition to "working elsewhere") "free," "busy," "tentative," or "out of office." "Working elsewhere" is just one example to indicate a user working remotely and being available completely or partially for work-related events/services. Other indicators such as "available elsewhere," "working remotely," "remotely available," or similar ones may be employed using the principles described herein.

Figure 3:
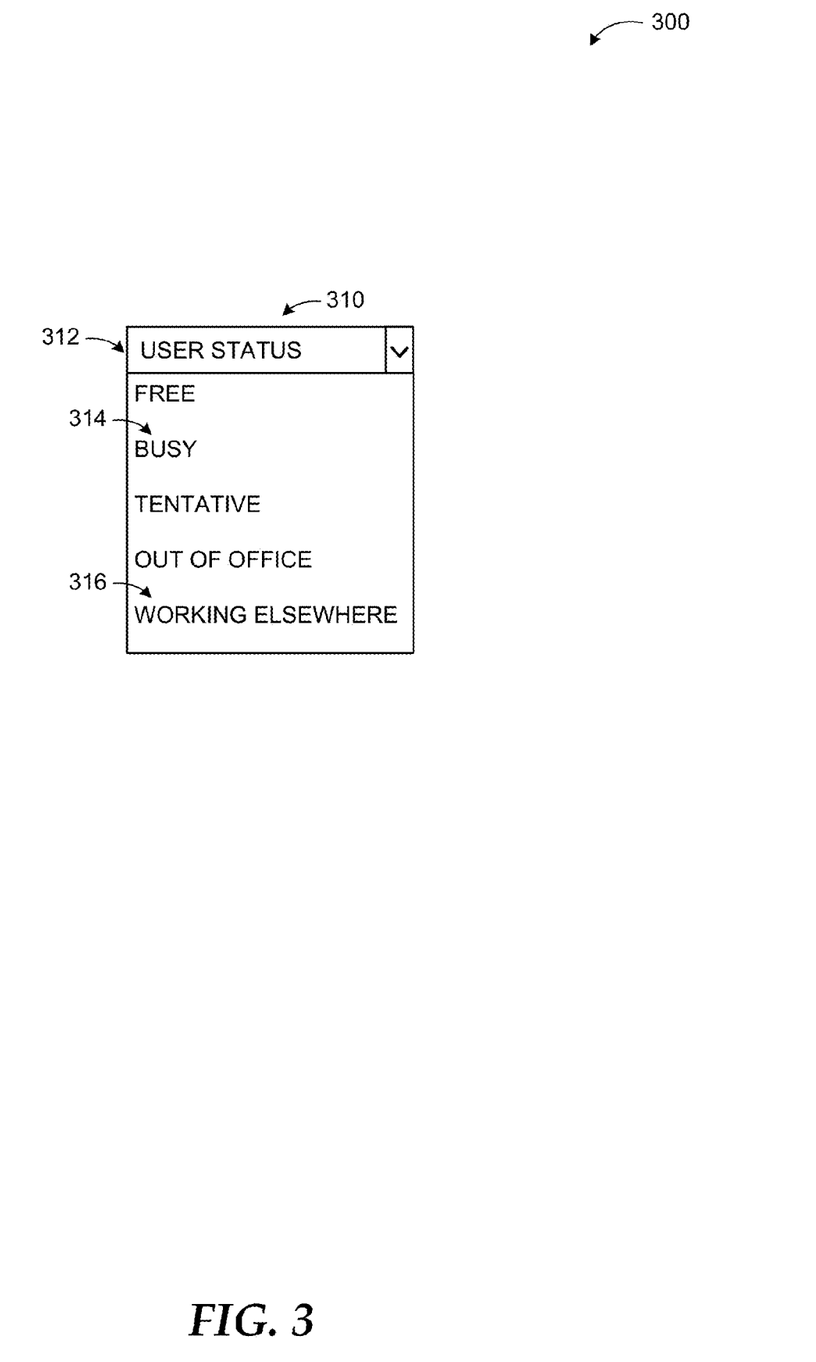
FIG. 3 illustrates an example user interface providing user presence information including a working elsewhere status.

FIG. 3 illustrates an example user interface providing user presence information including a working elsewhere status. Diagram 300 displays a user interface pane displaying example choices for a user status.

The user interface pane 310 may be displayed by a client application enabling a user to set their status 312 for scheduling, communication, or similar applications. Example user statuses may include "free," "busy" (314), "tentative," and "out of office." Additionally, the user interface pane 310 may display "working elsewhere" 316 status to indicate the user's availability at a location other than regular work location.

According to some embodiments, an application may receive a request for the location of the user from an authorized requester. The authorized requester may be another user authenticated by the application through an authentication scheme such as login. The application may provide the actual location of the user to the authorized requester such that the requester can schedule communication sessions, online meetings, or even in-person meetings for themselves or other people at near the actual location of the user.

According to other embodiments, the application may determine an authorization level of a user requesting the user's status. The application may then provide the location of the user after determining the requesting user having a privilege to access the user's location. Alternatively, the application may hide the actual location of the user after determining the requesting user lacking a privilege to access the location of the user.

According to further embodiments, the application may detect the working elsewhere status from a predetermined schedule, a location information, and/or comparable information. For example, the user may access a building using an access card or similar access mechanism (e.g., biometric access) at a location other than the user's regular work location. In response to detecting this, the application may change the status of the user to working elsewhere if the time is regular work hours. The user may then change that setting or leave it.

The example scenarios and schemas in FIGS. 2 and 3 are shown with specific components, data types, and configurations. Embodiments are not limited to systems according to these example configurations. Providing a working elsewhere status may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
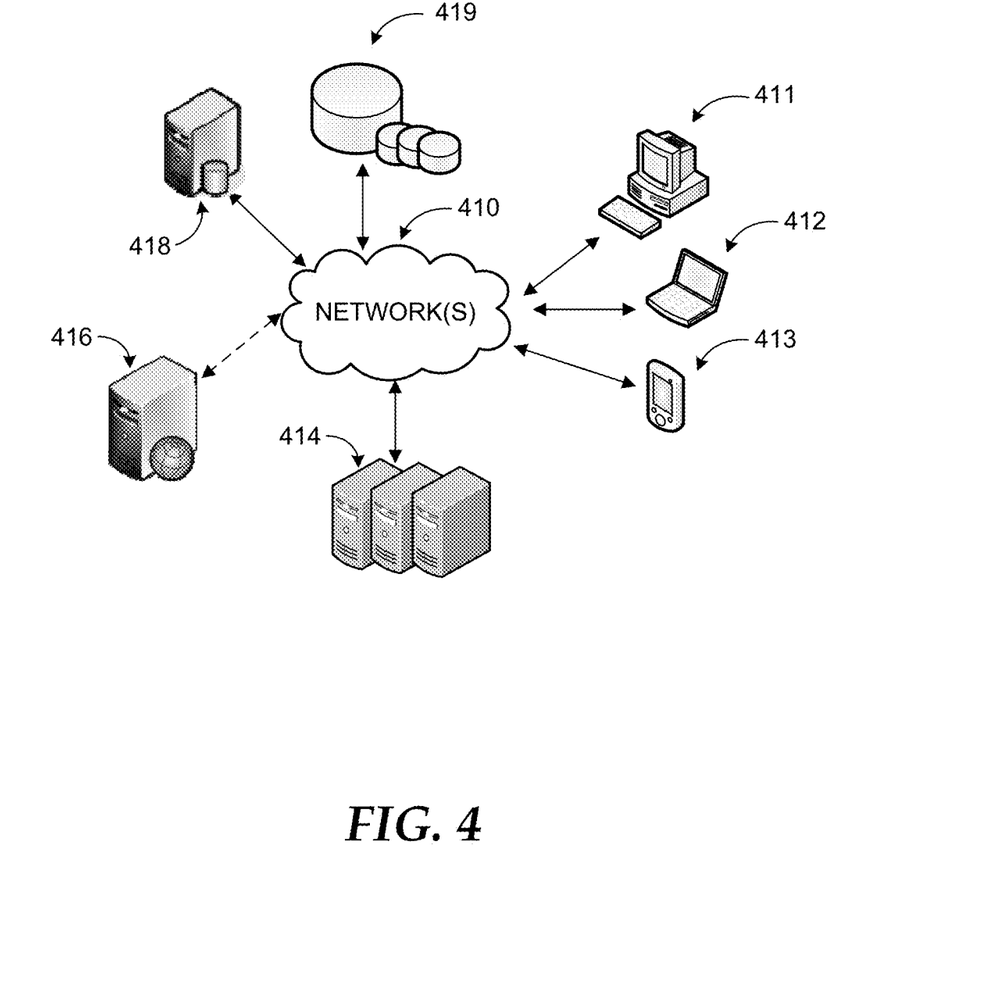
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service.

The communication application may communicate with client interfaces on individual computing devices such as a smart phone 413, a laptop computer 412, or desktop computer 411 ('client devices') through network(s) 410.

As discussed above, an application may represent users who are working at a location other than their regular work location and are available for online meetings or communication sessions with a working elsewhere status. The working elsewhere status may be presented to client applications about the user's availability for meetings, where a modality of communications/online meetings may be determined based on the user's actual location.

Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide a working elsewhere status. Furthermore, the networked environments discussed in FIG. 4 are for illustration purposes only. Embodiments are not limited to the example applications, modules, or processes.

Figure 5:
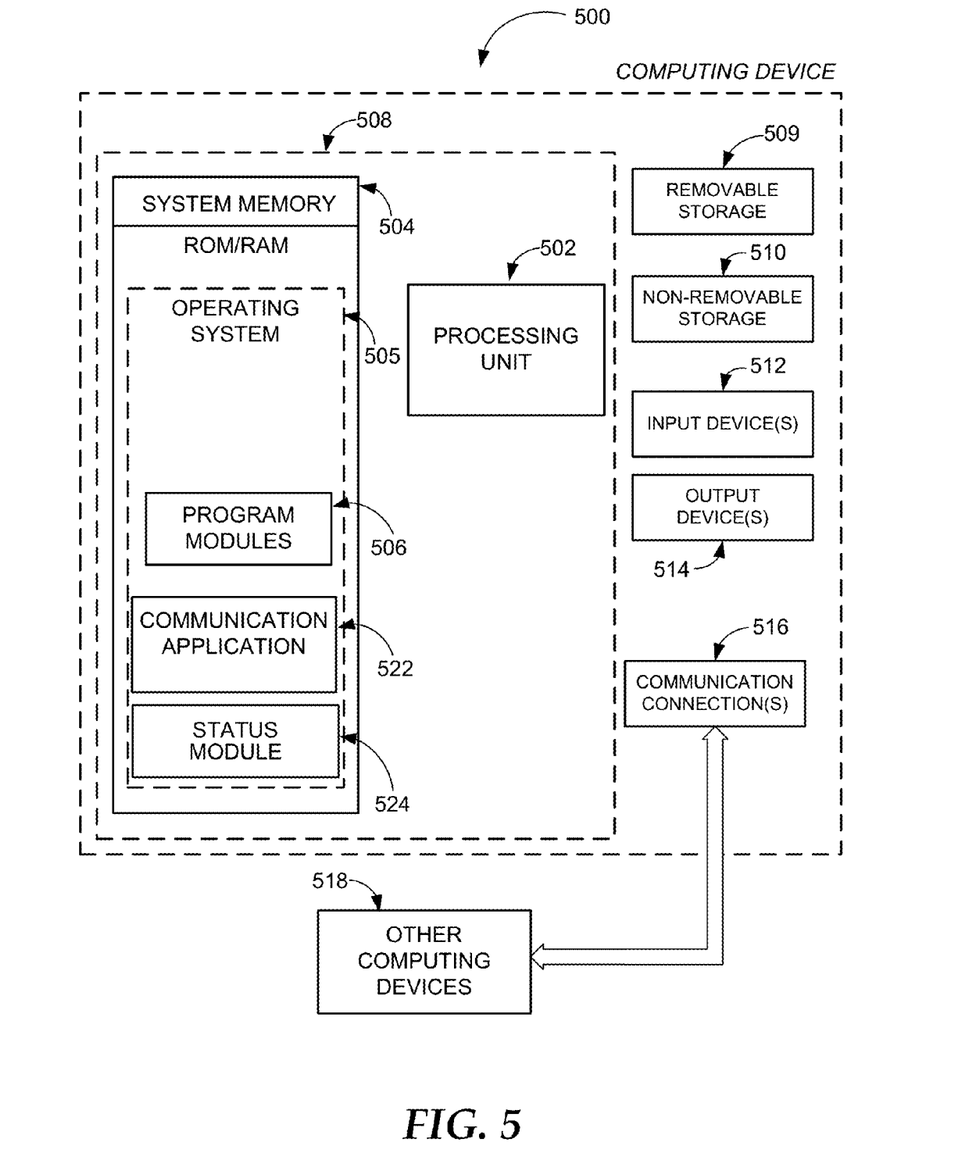
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, communication application 522, and status module 524.

Communication application 522 may represent a user working at a location other than their regular work location through a working elsewhere status according to embodiments. The status module 524 may detect the user's location and/or availability through user input, information from a calendaring application, a presence state, or additional sources, and provide the working elsewhere status to client applications inquiring about the status of the user. The status module 524 may also determine an authorization level of a user inquiring about the remotely available user. According to the level of authorization of the inquiring user, the status module 524 may provide more or less information about the remotely available user through the working elsewhere status (e.g., actual location). This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
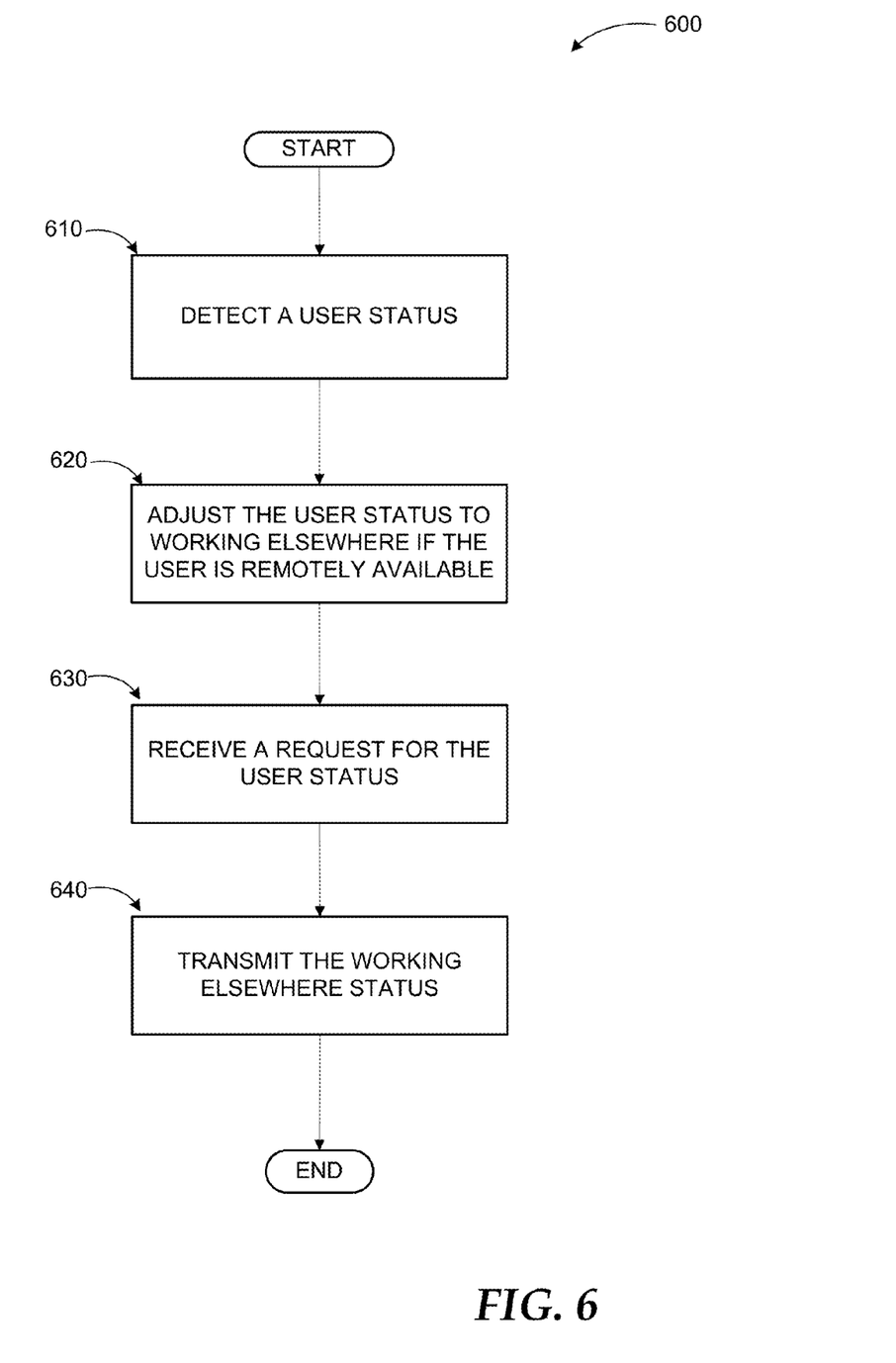
FIG. 6 illustrates a logic flow diagram for a process of providing a working elsewhere status according to embodiments.

FIG. 6 illustrates a logic flow diagram for a process of providing a working elsewhere status according to embodiments. Process 600 may be implemented by a communication, presence, calendaring, or similar application in some examples.

Process 600 may begin with operation 610 where an application may detect a user's status. The detected status may include a location, an availability, and other information. For example, if the user is at a remote work site during normal work hours, the application may infer that the user is remotely available in the absence of other indications in the user's calendar, etc. At operation 620, the application may adjust the status of the user to a working elsewhere status. This status may indicate that the user is working and may be available for online meetings and/or communication sessions. A modality of the online meetings and/or communication sessions may depend on the user's actual location and capabilities at the location. The status information may also indicate to others that the user is not available for in-person meetings. Thus, other users may plan meetings or communication sessions accordingly.

At operation 630, the application may receive a request for the user's status. The request may be from an authorized user utilizing another client application. The application may transmit the working elsewhere status of the user at operation 640 to the requesting application. An authorized user may be enabled to see additional information within the working elsewhere status such as the location of the user.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Representing remote users through remote status may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for providing an availability status, the method comprising:
   determining a location of a user to be other than a regular work location of the user;
   determining an actual location of the user by utilizing a global positioning system (GPS), a wireless network triangulation, or a wired network tracking of the location of the user;
   determining that the user is available at least in a limited manner;
   assigning the user a "working elsewhere" status indicating the user's availability at the location other than the regular work location of the user; and
   publishing the user's "working elsewhere" status in addition to at least one of a "free," "busy," "tentative," and "out of office" status to one or more applications consuming status information.

2. The method of claim 1, wherein the user's location and availability is determined by one of: a local application and a hosted service.

3. The method of claim 2, wherein the local application is one of: a scheduling application and a communication application.

4. The method of claim 2, wherein the hosted service is one of: a scheduling service, a communication service, and a location based service.

5. The method of claim 2, wherein the "working elsewhere" status is published as a presence status by the hosted service.

6. The method of claim 1, further comprising:
determining the location and availability of the user from a user selection of availability status.

7. The method of claim 1, further comprising:
assigning the "working elsewhere" status based on inferring the location and availability of the user.

8. The method of claim 7, wherein the location and availability of the user is inferred based on information obtained from at least one from a set of: a personal calendar, a work calendar, available communication modalities at a computing device of the user, active communication modalities at the computing device of the user, and the actual location of the user.

9. The method of claim 8, further comprising:
publishing the actual location of the user along with the "working elsewhere" status to authorized users.

10. A computing device for providing an availability status, the computing device comprising:
a memory configured to store instructions; and
a processor coupled to the memory, the processor executing an application in conjunction with the instructions stored in the memory, wherein the application is configured to:
determine a location of a user to be other than a regular work location of the user;
determine an actual location of the user by utilizing a global positioning system (GPS), a wireless network triangulation, or a wired network tracking of the location of the user;
determine that the user is available at least in a limited manner;
assign the user a "working elsewhere" status indicating the user's availability at the location other than the regular work location of the user; and
publish the user's "working elsewhere" status in addition to at least one of a "free," "busy," "tentative," and "out of office" status to one or more applications consuming status information.

11. The computing device of claim 10, wherein the application is further configured to:
infer the location and availability of the user on information obtained from at least one from a set of: a personal calendar, a work calendar, available communication modalities at the computing device of the user, active communication modalities at the computing device of the user, a location service, a social networking site schedule, a work-related application usage, a building access system usage, and a biometric access system usage.

12. The computing device of claim 10, wherein the application is further configured to:
publish additional information comprising one or more of the actual location of the user, available communication modalities for the user, and scheduling information for the user along with the "working elsewhere" status.

13. The computing device of claim 12, wherein the additional information is published based on at least one from a set of: a user preference, a default rule, a customizable rule, and a permission level of other users.

14. The computing device of claim 10, wherein the application is one of: a communication application, a scheduling application, and a location based service application.

15. The computing device of claim 10, wherein the application is configured to determine a modality of communication with the user based on the "working elsewhere" status, the modality comprising one or more of: an audio communication, a video communication, a data exchange, an application sharing, and a text message exchange.

16. The computing device of claim 10, wherein the location of the user is one of: a home location, a different work-related location, and a transportation mode.

17. A computer-readable memory device with instructions stored thereon for providing an availability status, the instructions comprising:
determining a location of a user to be other than a regular work location of the user;
determining an actual location of the user by utilizing a global positioning system (GPS), a wireless network triangulation, or a wired network tracking of the location of the user;
determining that the user is available at least in a limited manner;
assigning the user a "working elsewhere" status indicating the user's availability at the location other than the regular work location of the user;
publishing the user's "working elsewhere" status in addition to at least one "free," "busy," "tentative," and "out of office" status to one or more applications consuming status information;
indicating details of available communication modalities within the user's "working elsewhere" status;
enabling the user to choose the available communication modalities depending on the user location; and
enabling another user to at least one of schedule an online meeting, move an in-person meeting, cancel an in-person meeting, and select an available communication modality for a planned communication session with the user based on the "working elsewhere" status and the indicated details within the "working elsewhere" status.

18. The computer-readable memory device of claim 17, wherein the instructions further comprise:
notifying a communication service to limit communication modalities for the user based on the "working elsewhere" status.

19. The computer-readable memory device of claim 17, wherein the instructions further comprise:
determining an authorization level of another user to receive the location and schedule information associated with the user; and
publishing the actual location and additional schedule information of the user to the other user if the other user's authorization level is sufficient.

* * * * *